(12) United States Patent
McKenna et al.

(10) Patent No.: US 10,860,484 B2
(45) Date of Patent: Dec. 8, 2020

(54) DATA PROCESSOR HAVING A MEMORY-MANAGEMENT-UNIT WHICH SETS A DETERMINISTIC-QUANTITY VALUE

(71) Applicant: NXP USA, Inc., Austin, TX (US)

(72) Inventors: Daniel McKenna, Glasgow (GB); Jeffrey Thomas Loeliger, Glasgow (GB); Ewan Harwood, Strathaven (GB)

(73) Assignee: NXP USA, Inc., Austin, TX (US)

( * ) Notice: Subject to any disclaimer, the term of this patent is extended or adjusted under 35 U.S.C. 154(b) by 287 days.

(21) Appl. No.: 15/481,580

(22) Filed: Apr. 7, 2017

(65) Prior Publication Data

US 2017/0344477 A1    Nov. 30, 2017

(30) Foreign Application Priority Data

May 27, 2016  (EP) .................................. 16171827

(51) Int. Cl.
*G06F 12/08*    (2016.01)
*G06F 9/50*    (2006.01)
(Continued)

(52) U.S. Cl.
CPC ........ *G06F 12/0811* (2013.01); *G06F 9/3804* (2013.01); *G06F 9/5016* (2013.01); *G06F 12/0853* (2013.01); *G06F 12/0888* (2013.01); *G06F 13/16* (2013.01); *G06F 13/4022* (2013.01); *G06F 2212/1008* (2013.01);
(Continued)

(58) Field of Classification Search
CPC ............................ G06F 12/08; G06F 12/0888
See application file for complete search history.

(56) References Cited

U.S. PATENT DOCUMENTS 5,619,669 A    4/1997   Katsuta
6,654,846 B1 *  11/2003  Franca-Neto ....... G06F 13/4045
                                                    370/908
(Continued)

FOREIGN PATENT DOCUMENTS

EP      1213650 A2    12/2002
EP      1702272       9/2006
WO      2005069151 A1  7/2005

*Primary Examiner* — Charles Rones
*Assistant Examiner* — Tian-Pong Chang

(57) ABSTRACT

A data processor comprises a memory-management-unit for receiving external-operation-data from a CPU. The memory-management-unit sets a deterministic-quantity value for the external-operation-data based on the external-operation-data. The deterministic-quantity value may be either an active-value or an inactive-value. The data processor has a non-deterministic-processor-block for receiving a memory-signal from the memory-management-unit, and has a control-block configured to (i) send the memory-signal to an NDP-output-terminal if the deterministic-quantity value is the active-value, thereby bypassing a performance-enhancement-block, or (ii) send at least a portion of the memory-signal that is representative of the request for response-data to the performance-enhancement-block if the deterministic-quantity value is the inactive-value.

17 Claims, 4 Drawing Sheets

(51) Int. Cl.
    *G06F 13/40*         (2006.01)
    *G06F 12/0811*     (2016.01)
    *G06F 12/0888*     (2016.01)
    *G06F 13/16*         (2006.01)
    *G06F 9/38*          (2018.01)
    *G06F 12/0853*     (2016.01)

(52) U.S. Cl.
    CPC ............... *G06F 2212/1052* (2013.01); *G06F 2212/173* (2013.01); *G06F 2212/283* (2013.01)

(56) References Cited

U.S. PATENT DOCUMENTS

| | | | |
|---|---|---|---|
| 6,895,496 B1* | 5/2005 | Taniguchi | G06F 9/30058 712/207 |
| 7,562,207 B2 | 7/2009 | Alsup et al. | |
| 2003/0163678 A1* | 8/2003 | Brockmann | G06F 9/3806 712/239 |
| 2008/0104329 A1* | 5/2008 | Gaither | G06F 12/0888 711/138 |
| 2010/0325419 A1* | 12/2010 | Kanekar | H04L 63/0823 713/151 |
| 2012/0072632 A1 | 3/2012 | Kimelman | |
| 2013/0054896 A1* | 2/2013 | Colavin | G06F 12/084 711/118 |
| 2013/0103909 A1* | 4/2013 | Pangborn | G06F 12/08 711/138 |
| 2014/0164713 A1* | 6/2014 | Sim | G06F 12/0888 711/138 |
| 2015/0205724 A1 | 7/2015 | Hancock et al. | |
| 2016/0161259 A1* | 6/2016 | Harrison | G01S 19/48 701/409 |
| 2018/0181314 A1* | 6/2018 | Dhuse | G06F 3/067 |

* cited by examiner

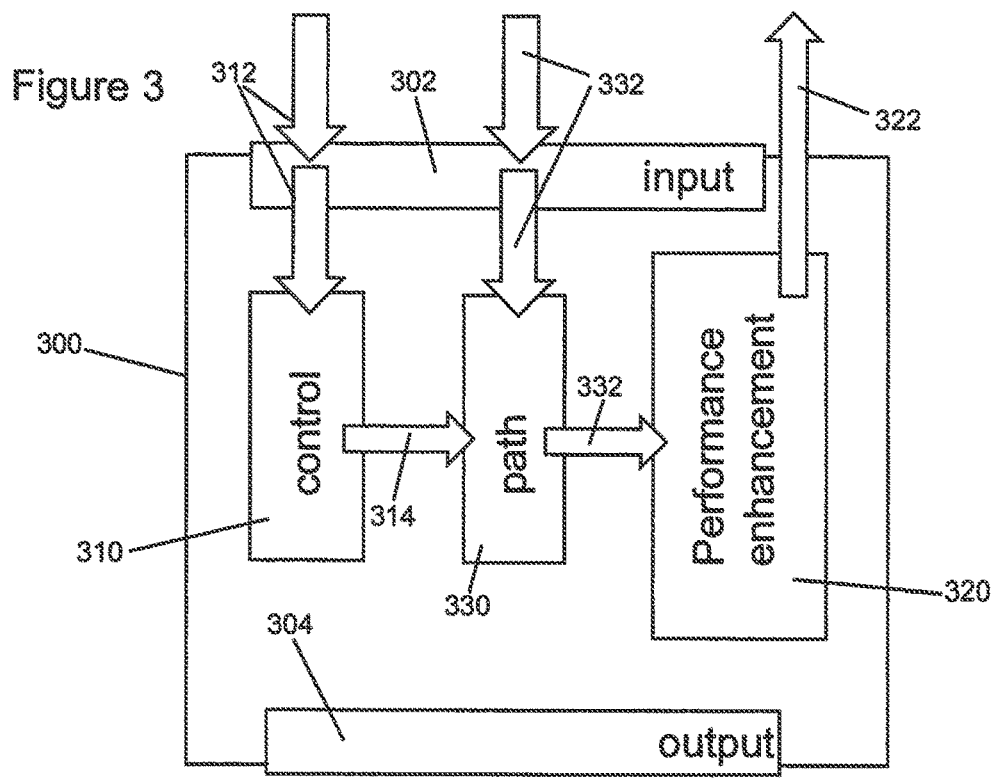
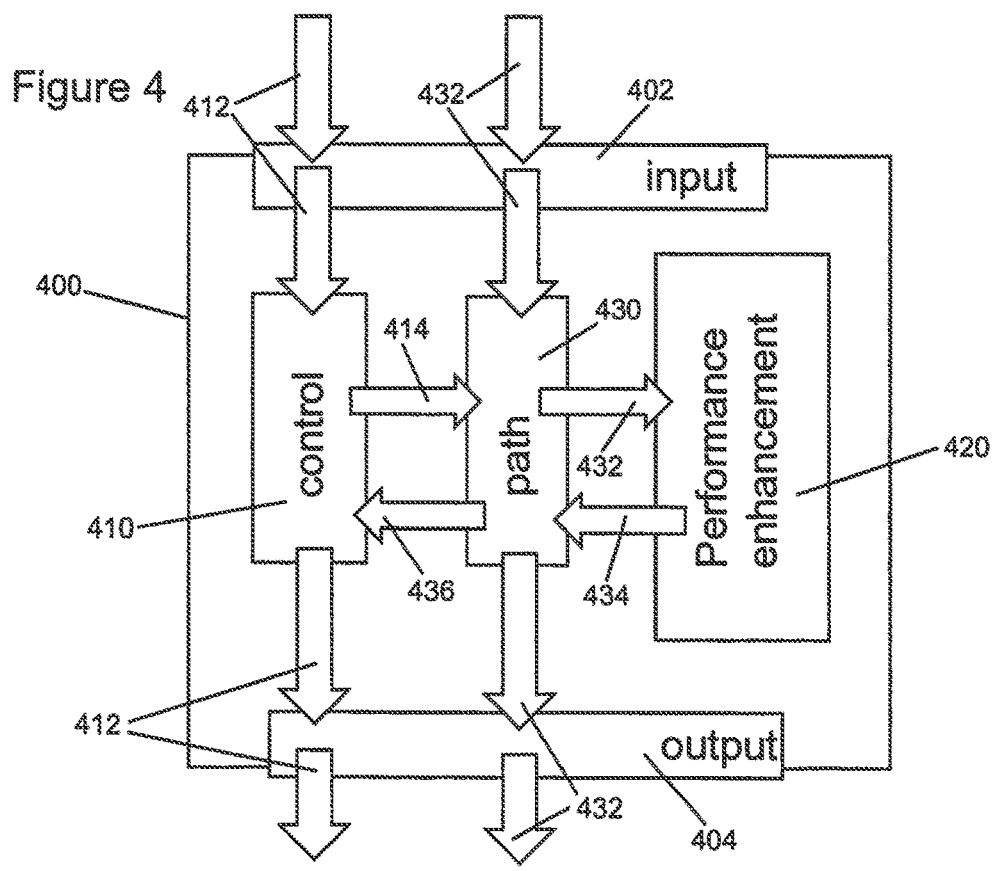

DATA PROCESSOR HAVING A MEMORY-MANAGEMENT-UNIT WHICH SETS A DETERMINISTIC-QUANTITY VALUE

FIELD

The present disclosure relates to data processors and in particular data processors that comprises components with non-deterministic, or time variable, data processing behaviour.

BACKGROUND

In order to increase performance, modern data processors, including integrated circuit systems such a 'System-on-Chip' (SoC) data processors, contain multi-level memories (which may be, for example, multi-level caches or multi-level local memories), pre-fetch buffers, branch target buffers and other such performance enhancement features. Whilst these features can greatly increase the performance of a data processor, they do so at the cost of a reduction in determinism.

In this context, determinism refers to the certainty that a particular event, initiated by a data processor, will occur at a particular determined time. For example, a data processor may execute a software program designed to initiate the supply of an electrical current pulse to an electronic component, outside of the data processor, at a specific time. If the electrical current pulse can be guaranteed to arrive at the electronic component, at the specific time, with only a small margin of temporal error, then the process may be said to have a high degree of determinism, or to be 'highly deterministic'. Conversely, if the current pulse can only be guaranteed to arrive at the specific time, plus or minus a large temporal error margin, then the process may be said to have a low degree of determinism.

Where a data processor comprises performance enhancing components, such as a cache memory, the operation of the performance enhancing components may introduce a large temporal uncertainty into the point in time that an instruction, processed by the data processor, may actually be performed outside of the processor. For example, a processor core may execute the same function at two different points in time and, depending on the current state of the performance enhancement resources, the completion time for an external instruction may vary dramatically. In a first instance, the function may call on data that may be held in the cache memory, and where the cache memory does in fact comprise the relevant data, the data may be supplied to the processor core rapidly, thereby enabling the rapid performance of the external instruction.

However, in a second instance, the cache memory may, at a subsequent time, not comprise the relevant data. Then, having interrogated the cache memory and determined that the relevant data is not present (a process which takes some amount of time) the data processor may consequently send a request for the relevant data to a main memory, which may be much slower to access than the cache memory. When relevant data is finally provided to the processor core, to enable it to provide for the performance of the external instruction, a significantly larger period of time may have elapsed, compared to the provision of the same data in the first instance. In this way, the period of time between the processor core calling for specific data and the external instruction actually being performed may be highly variable, that is, it may exhibit a low degree of determinism.

Data processors that exhibit a low degree of determinism present a significant problem for many applications, such as automotive applications. For example, the operation of powertrain systems may benefit from guaranteed real time behaviour. A particular example of this is provided by the timing of spark plug ignition in an internal combustion engine; where spark plugs are fired with a high degree of determinism (within a margin of error of a few nanoseconds) then superior combustion efficiency may be delivered. Conversely, a large margin of error provided by a data processor with a low degree of determinism may substantially reduce combustion efficiency. The need for increased determinism is likely to increase as Central Processor Units (CPUs) become more complex, for example as CPUs increasingly comprise multiple cores with multiple threads.

BRIEF DESCRIPTION OF THE DRAWINGS

The figures and Detailed Description that follow also exemplify various example embodiments. Various example embodiments may be more completely understood in consideration of the following Detailed Description in connection with the accompanying Drawings.

One or more embodiments will now be described by way of example only with reference to the accompanying drawings in which:

FIG. 3 shows an example embodiment of a non-deterministic-processor block when a deterministic bit is set to an inactive value;

FIG. 4 shows another example embodiment of a non-deterministic-processor block when a deterministic bit is set to an inactive value;

DETAILED DESCRIPTION OF THE DRAWINGS

Figure 1:
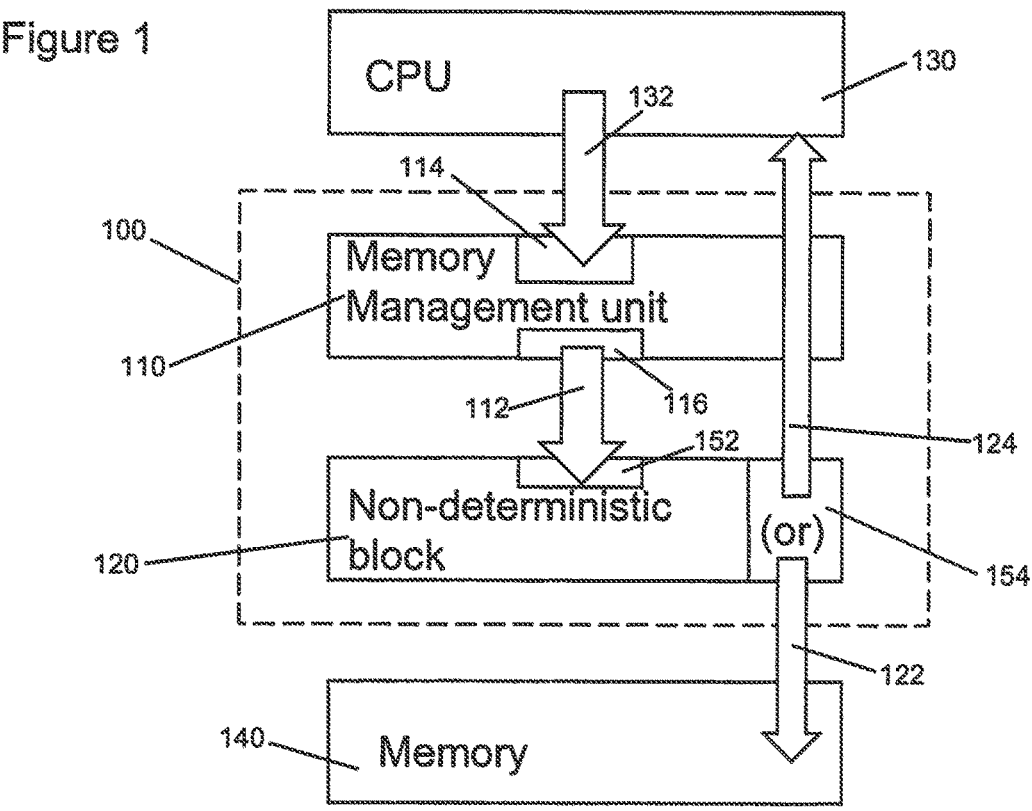
FIG. 1 shows an example embodiment of a data processor comprising a memory-management-unit coupled to a non-deterministic-processor block.

FIG. 1 shows a data processor 100 comprising a memory-management-unit 110 coupled to a non-deterministic-processor-block 120. The data-processor 100 is coupled to a CPU 130 and also coupled to a memory 140. When operating, the CPU 130 may require particular data that is stored outside of, or external to, the CPU 130. In order to obtain the particular data, the CPU may generate external-operation-data 132 that is representative of a request for the particular data, which may be called response-data.

The memory-management-unit 110 comprises a MMU-input-terminal 114 and a MMU-output-terminal 116. The MMU-input-terminal 114 is configured to receive the external-operation-data 132 from the CPU 130. The memory-management-unit 110 is also configured to set a deterministic bit value for the external-operation-data, based on the external-operation-data. Depending on the content of the external-operation-data, it may or may not be important that the data processor 100 operates with a high degree of determinism. The value of the deterministic bit may be set according to whether determinism is important for a particular process or not. Therefore, the deterministic bit value may be either an active-value or an inactive-value, where the active-value is set when a high degree of determinism is required, while the inactive-value is set when the degree of determinism for a given process is not as important. Persons skilled in the art will appreciate that the active value could be a logical 1 while the inactive value could be a logical 0, or vice versa. More generally, the deterministic bit is an example of a deterministic-quantity, which may have a value that is either an active-value or an inactive-value. In some examples a deterministic-quantity may be a multi-bit word or any other data structure that may indicate whether a higher degree of determinism (an active-value) or a lower degree of determinism (an inactive-value) is desired. In further examples still, the deterministic-quantity may have one of a plurality of active-values, which can be used to set a priority level with which the external-operation-data is processed when an active-value is set.

The memory-management-unit 110 is configured to provide a memory-signal 112, based on the external-operation-data and the deterministic bit value, to the MMU-output-terminal 116. The memory-signal 112 thereby comprises the information contained in external-operation-data and the information contained in the deterministic bit.

The non-deterministic-processor-block 120 comprises a NDP-input-terminal 152 configured to receive the memory-signal 112 from the MMU-output-terminal 116. Thereby, the non-deterministic-processor-block 120 receives information representative of the request for response-data, required by the CPU 130, and the deterministic bit value, which defines whether the particular response-data is required on either a deterministic basis (that is, with a well-known and highly accurate time delay) or a non-deterministic basis, where the exact time delay is not important. If the exact time delay is unimportant then faster provision of the response-data may be possible, even though the faster response may consequently be less deterministic.

The non-deterministic-processor-block 120 may then perform in one of three possible ways, as discussed in greater detail below in relation to FIGS. 2, 3 and 4. If the deterministic bit is set to the active-value then the non-deterministic-processor-block 120 may send a request 122 for the response-data directly to the memory 140, as described in relation to FIG. 2. If the deterministic bit is set to the inactive-value, then the non-deterministic-processor-block may check internal memory resources to discover if the response-data is stored locally in one of these internal memory resources. If the response-data is stored locally, as descried further in relation to FIG. 3, then the response-data may be sent via an appropriate signal 124 to the CPU 130. This signal 124 may be sent directly, from a NDP-output-terminal 154 of the non-deterministic-processor-block 120 to the CPU 130 as shown, or may be sent via any other convenient signal pathway. Alternatively, if the response-data is not stored locally, as described below in relation to FIG. 4, then the request 122 for the response-data may be sent to the memory 140. It will be appreciated that checking to determine whether the non-deterministic-processor-block 120 comprises the response-data, before sending the request to the memory 140 if it does not, introduces a variable length time delay into the process, which thereby decreases the determinism of the process.

Figure 2:
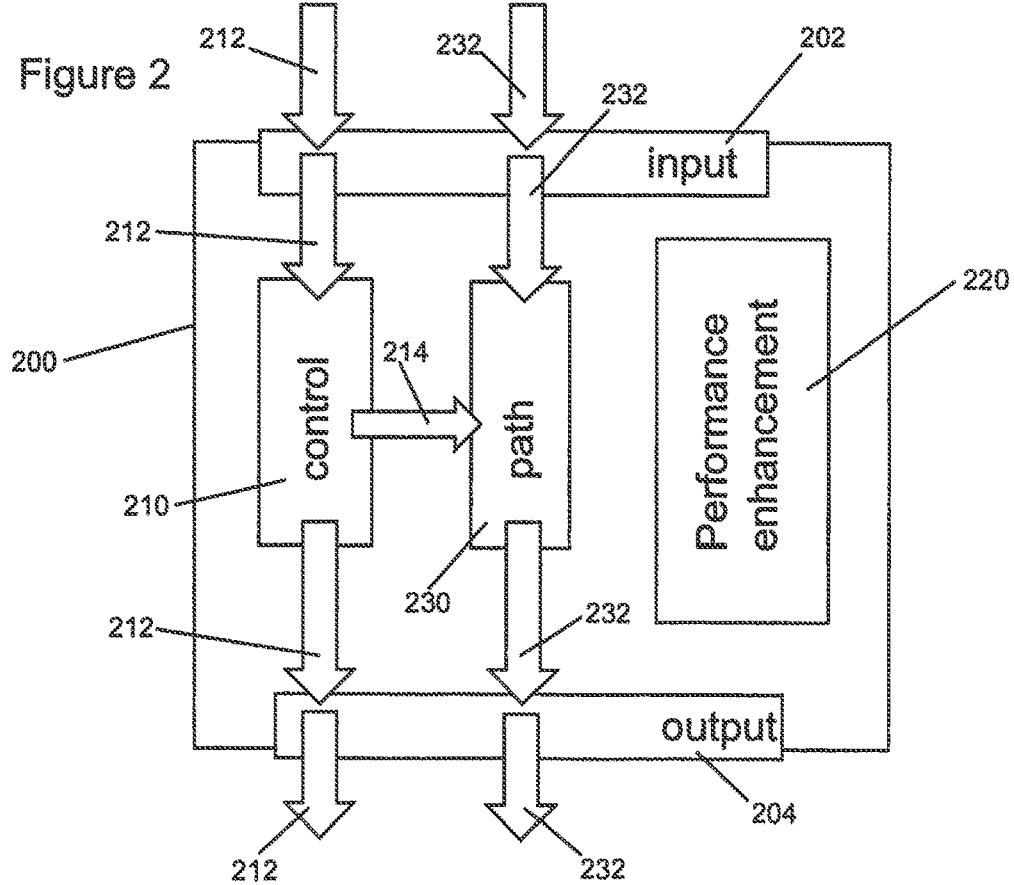
FIG. 2 shows an example embodiment of a non-deterministic-processor block when a deterministic bit is set to an active value.

FIG. 2 shows a non-deterministic-processor-block 200 with an NDP-input-terminal 202 and an NDP-output-terminal 204. The non-deterministic-processor-block 200 comprises a control-block 210, a performance-enhancement-block 220, and a path-block 230.

The NDP-input-terminal 202 is configured to receive the memory-signal from the memory-management-unit (not shown). In this example, the memory-signal comprises two components: a control-signal 212 and a request-signal 232. The control-signal 212 is representative of the deterministic bit value. The request-signal 232 is representative of the request for response-data.

The non-deterministic-processor-block 200 further comprises a path-block 230, configured to receive the request-signal, while the control-block 210 receives the control-signal 212. In this example, the deterministic bit value is set as the active-value. Therefore, the control-block 210 provides a path-control-signal 214 to the path-block 230. The path-control-signal instructs the path-block 230 to send the request-signal 232 directly to the NDP-output-terminal 204. Thereby, the request-signal 232 bypasses the performance enhancement block 220, the functionality of which will be described below in relation to FIGS. 3 and 4. The control-block 210 also sends the control-signal 212 to the NDP-output-terminal 204. The NDP-output-terminal 204 can thereby provide the memory-signal to a memory (not shown) that stores the response-data requested by the CPU. In this example the NDP-input-terminal 202 is shown as a single block. However, it will be appreciated that the NDP-input-terminal 202 may comprises a plurality of terminals or pins, each terminal or pin configured to receive a particular part of the memory-signal. Similarly, the NPD-output-terminal 204 may also comprise a plurality of terminals or pins.

The amount of time taken by the non-deterministic-processor-block 200 to receive the memory-signal and then provide the memory-signal to the NDP-output-terminal 204, when the deterministic bit value is the active-value, may be known to a relatively high degree of accuracy. Therefore, when the deterministic bit value is the active-value, the time required for a request for response-data to propagate from the CPU to the memory, and for the response-data to be sent to the CPU, may be known with a high degree of accuracy. The time required for requests for response-data may also have a high degree of consistency with different requests for different response-data occurring at different times all taking the same amount of time to be processed, each with the same relatively high degree of accuracy. By consistently providing request-data in the same amount of time the data processor may operate with a high degree of determinism.

FIG. 3 shows a non-deterministic-processor-block 300 that is similar to the non-deterministic-processor-block of FIG. 2. Similar features have been given similar reference numerals and may not necessarily be discussed further here.

In FIG. 3, a control signal 312 is representative of the deterministic bit having the inactive-value. Consequently, the control-block sends a path-control-signal 314 to the path-block 330 such that the path-block 330 is thereby configured to send the request-signal 332 to the performance enhancement block 320. In some examples, the path-block 330 may be configured to send the entire memory-signal to the performance enhancement block 320. Generally, the signal sent to the performance enhancement block should be representative of the request for response data, although it will be appreciated that the signal could be a modified or adapted version of the memory-signal, or a portion of the memory-signal.

The performance enhancement block 320 may be a cache memory, a branch target buffer, or a pre-fetch buffer, as non-limiting examples. The performance enhancement block 320 stores data that may be required by the CPU. Since the performance enhancement block 320 is situated closer to the CPU, and may comprise very high speed memory, the performance enhancement block 320 may be able to provide data to the CPU more quickly than the main memory if it has access to the requested data. The content of the performance enhancement block will typically vary over time. The performance enhancement block may be configured to attempt to predict what information will be required by the CPU based on recent CPU behaviour. This may increase the likelihood that the content will be relevant, but it means that on some occasions particular request-data may be present in the performance enhancement block 320, while on other occasions the same request-data may not be present.

In the example of FIG. 3, the performance enhancement block does have access to the response-data and is configured to send the response-data 322 to the CPU (not shown). It will be appreciated that the response-data 322 may be sent directly, or indirectly, to the CPU.

FIG. 4 shows a non-deterministic-processor-block 400 that is similar to the non-deterministic-processor-block of FIGS. 2 and 3. Similar features have been given similar reference numerals and may not necessarily be discussed further here.

In this example, the performance enhancement block 420 does not have access to the request-data. When the absence of the request-data is established, the performance enhancement block 420 is configured to cause the memory-signal to be sent to the NDP-output-terminal 404. In this way the memory-signal may be sent to the main memory to retrieve the request data in the same way as shown in FIG. 2. In this example, the performance enhancement block 420 sends a PE-path-control-signal 434 to the path block 430 which configures the path block 430 to: i) send the request-signal 432 to the NDP-output-terminal 404; and ii) to send a further-path-control-signal 436 to the control-block 410, which configures the control-block 410 to send the control-signal 412 to the NDP-output-terminal 404. In other examples, the performance enhancement block 420 may be configured to send control signalling directly to both the path-block 430 and the control-block 420 such that the control-signal 412 and the request-signal 432 may be provided to the NDP-output-terminal 404.

The scenarios described above in relation to FIGS. 3 and 4 provide at least two sources of non-deterministic behaviour. Firstly, the time taken to provide request-data to the CPU may be dramatically different depending on whether the request-data can be provided by a performance enhancement block or not. Secondly, the performance enhancement block may itself exhibit non-deterministic behaviour even when it does comprise the request-data: the speed with which the performance enhancement block identifies the request-data and provides it to the CPU may be variable, depending on such factors as where the request-data is stored within the performance enhancement block or whether the performance enhancement block has received other requests for information, potentially from other CPUs or other cores within the same CPU, for example. In the event that other requests have been received, the performance enhancement block may have a queue of requests to process and the time taken will thereby depend on the length of the queue. However, these uncertainties in response time may be effectively eliminated by setting the deterministic bit value to the active-value, such that the non-deterministic-processor-block actively bypasses any non-deterministic components, such as performance enhancement blocks, and thereby processes the memory-signal in a deterministic way.

In relation to FIGS. 2 to 4, the path-blocks have been presented as being structurally separate from the performance enhancement blocks. However, it will be appreciated that in other examples, the functionality of a path-block could be integrated into a performance enhancement block, such that the request-signal may be provided directly to the performance enhancement block and then processed either deterministically, if the deterministic bit value is the active-value, or non-deterministically, if the deterministic bit value is the inactive-value.

Figure 5:
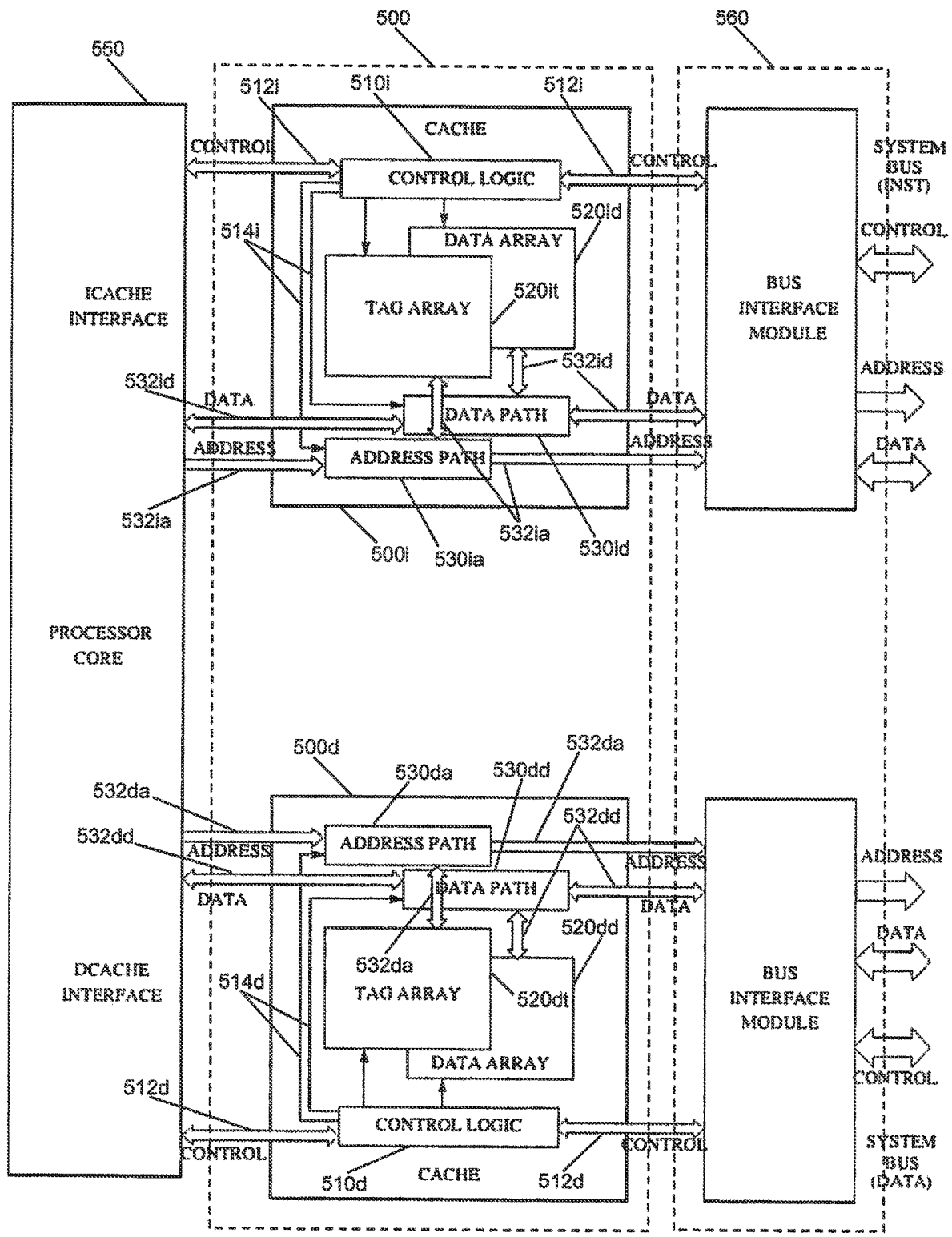
FIG. 5 shows an example embodiment of a data processor with separate pathways for instructions and data.

FIG. 5 shows a data processor 500 according to an embodiment of the present disclosure. Features of FIG. 5 that are similar to corresponding features of FIGS. 2 to 4 have been given similar reference numerals and may not necessarily be further discussed here.

The data processor 500 is divided into two parts, an instructions-cache 500*i* and a data-cache 500*d*. The instructions-cache 500*i* is for receiving instruction accesses from the CPU 550 while the data-cache 500*d* is for sending and receiving data to and from the CPU 550; differences between data and instructions in this context will be appreciated by persons skilled in the art. Corresponding features of the instructions-cache 500*i* and the data-cache 500*d* have been given corresponding reference numerals and will be described below in relation to the data-cache 500*d*.

The CPU 550 is configured to provide CPU-request data to the data-processor. The CPU-request data comprises a data-portion 532*dd* representative of a memory-access-operation, which may be a read operation or a write operation, and an address-portion 532*da* representative of a memory-location for performing the memory-access-operation. Thereby, the memory-location may be either written to, or read from, in accordance with the content of the data-portion 532*dd*.

The data-cache 500*d* comprises a control-block 510*d* configured to receive a control-signal 512*d* from the CPU 550. The data-cache 500*d* has an address-path-block 530*da* and a data-path-block 530*dd* that together form an example of a path-block. The address-path-block 530*da* is configured to receive the data-portion 532*da*. The data-path-block 530*dd* is configured to receive the address-portion 532*dd*.

The data-cache 500*d* has a tag-array 520*dt* and a data-array 520*dd* that together form an example of a performance-enhancement-block.

If a deterministic-quantity value, represented by the control-signal 512*d*, is set to the active-value, then the data-path-block 530*dd* sends the data-portion 532*dd* to the NDP-output-terminal. This enables the data-portion 532*dd* to be sent to a bus interface module 560 for onward processing by a suitable memory (not shown). Similarly, the address-path-block 530*da* sends the address-portion 532*da* to the NDP-output-terminal so that it may be sent to the bus interface module 560. In this way, the non-determinism associated with the performance-enhancement-block is bypassed and avoided.

Alternatively, if the deterministic-quantity value is the inactive-value, the data-path-block 530*dd* sends the data-portion 532*dd* to the data-array 520*dd* and the address-path-block 530*da* sends the address-portion 532*da* to the tag-array 520*dt*.

In some examples, the memory-management-unit may perform a more specialized functionality than generic memory management, for example the memory-management-unit may comprise a memory-protection-unit (MPU). In general, a MPU may be a subset of a MMU. A full MMU may provide memory re-mapping, translation and protection functionality. In contrast, a MPU may just provide memory protection functionality.

Figure 6:
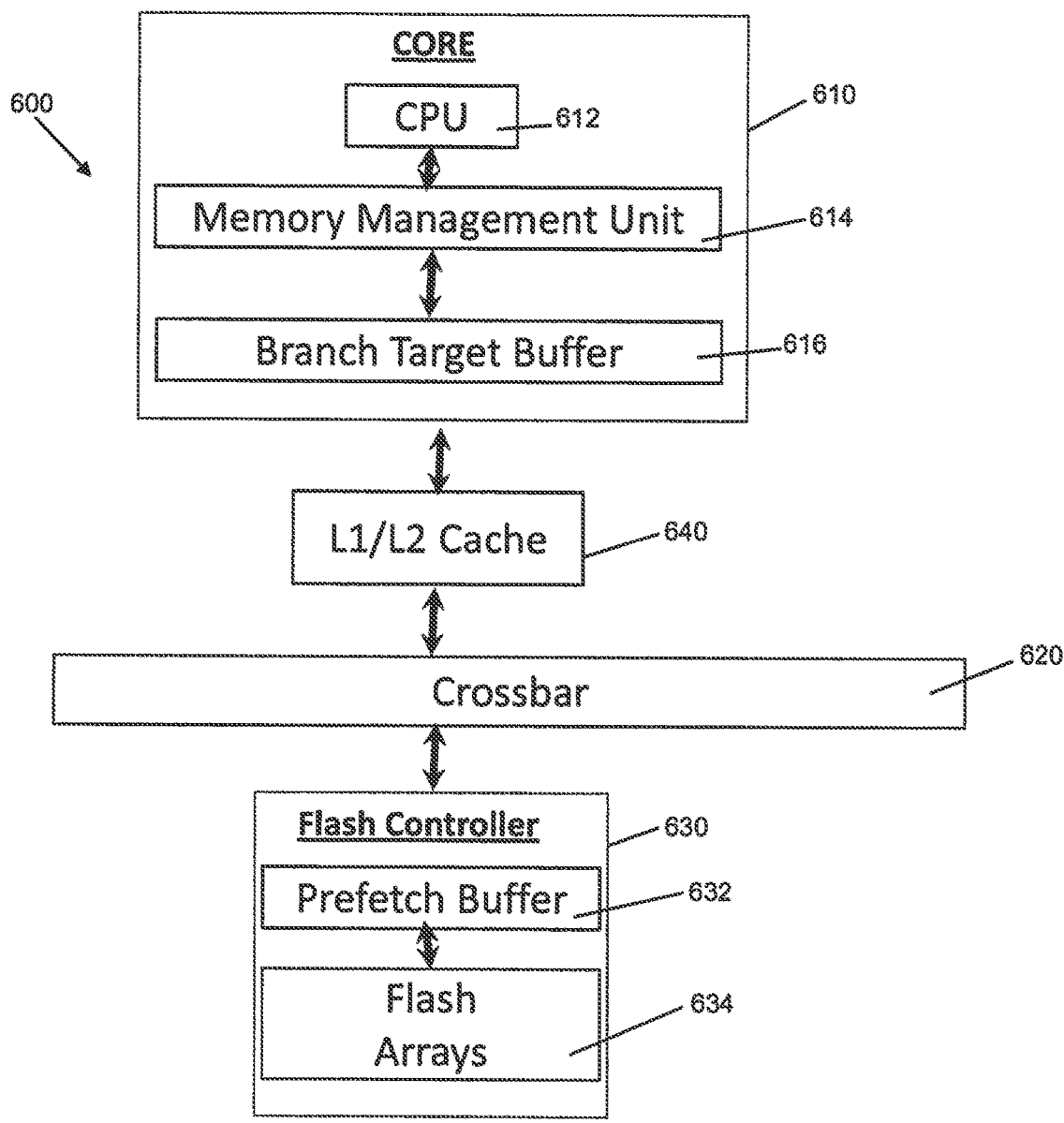
FIG. 6 shows an example embodiment of a data processor with a processor core and a memory array on opposite sides of a crossbar switch.

FIG. 6 shows a data processor 600 that comprises a core 610, with a CPU 612, a memory-management-unit 614 and a branch target buffer 616. The data processor 600 has memory 630 coupled to the core 610 by a crossbar 620. An L1/L2 cache 640 is provided between the core 610 and the crossbar 620. The memory 630 comprises pre-fetch buffer 632 and a flash array 634. Thereby, the data processor 600 comprises four separate components, the branch target buffer 616, the L1/L2 cache 640, the crossbar 620 and the pre-fetch buffer 632, that may exhibit non-deterministic behaviour. However, by controlling one or more of these components, based on the value of the deterministic bit, the data processor may either function with a high degree of determinism (when the deterministic bit value is the active-value) or with a lower degree of determinism, but potentially increased speed (when the deterministic bit value is the inactive-value).

The branch target buffer 616, the L1/L2 cache 640 and the pre-fetch buffer 632 are all examples of types of non-deterministic-processor-block, the functionality of which has already been described. It will be appreciated that, while FIG. 6 shows a data processor 600 with three non-deterministic-processor-blocks, other data processors may have any number of non-deterministic-processor-blocks that may benefit from using the deterministic bit, as described herein.

Since the crossbar 620 may also exhibit non-deterministic behaviour, it may also advantageously be controlled based on the value of the deterministic bit. The crossbar 620 functions as a switch, located between the memory-management-unit 614 and the memory 630. The crossbar 620 is configured to send data received from the memory-management-unit 614 to the memory 630 to enable the retrieval of request data. It will be appreciated that the crossbar 620 may also be connected to other memory units (not shown) and will be configured such that the memory signal is sent to the particular memory where the request-data is presumed to be stored. The crossbar 620 may also be configured to receive the request-data from the memory 630 and send it back to the CPU 612 that requested it.

To provide this functionality the crossbar 620 may be coupled, directly or indirectly, to the NDP-output-terminal (not shown), and be configured to receive the memory-signal from the NDP-output-terminal. The crossbar 620 may also be configured to receive a plurality of further-signals, each of the plurality of further-signals representative of respective requests for respective response-data stored in the memory. These further-signals may be generated by the CPU 612 responsible for the memory-signal, or by a different core of the same CPU 612, or even by a different CPU (not shown). In complex systems, the volume of signals received by the crossbar 620 may vary considerably from time to time. This variability may cause non-deterministic behaviour as signals may form a queue of variable length which may take a variable period of time for the crossbar 620 to process.

In order to improve the determinism of the data processor 600 it may be desirable to configure the crossbar 620 to set a priority-order for sending the memory-signal to the memory 630, based on the deterministic bit value. If the deterministic bit value is the inactive-value then the crossbar 620 may process the memory-signal non-deterministically, for example by processing it in the order that the signal is received relative to each of the plurality of further signals. However, if the deterministic bit value is the active-value, then the crossbar 620 may be configured to modify the sequence in which the memory-signal and the plurality of further-signals are processed. For example, the crossbar 620 may delay processing of the plurality of further-signals and process the memory-signal with the active-value deterministic bit first. In other examples, the crossbar 620 may be configured to process the memory-signal after a predetermined delay when the deterministic bit has an active-value. In this way, the predetermined delay may ensure that, no matter how busy crossbar 620 may be, it will always be able to process the memory-signal immediately after the predetermined delay. This delay may result in the request-data ultimately being provided to the CPU 612 more slowly, but with a higher degree of determinism.

In some examples a data processor may comprise a second-non-deterministic-processor-block. A second-non-deterministic-processor-block may be located between the memory-management-unit 614 and the crossbar 620 (such as the L1/L2 cache 640 shown in FIG. 6), or the crossbar 620 may be located between the memory-management-unit 614 and the second-non-deterministic-processor-block (such as the pre-fetch buffer 632 shown in FIG. 6). In either case, the second-non-deterministic-processor-block may be configured to receive the memory-signal, or a signal representative of the memory signal. Thereby, the second-non-deterministic-processor-block may be configured to receive information representative of the deterministic bit value. The second-non-deterministic-processor-block may then be configured to function as described above in relation to the non-deterministic-processor-block of FIGS. 2 to 4.

Generally, a data processor as described herein may comprise a plurality of non-deterministic-blocks, but may be configured to operate in a highly deterministic way by setting a deterministic bit value to the active value, such that each non-deterministic component is either bypassed, or otherwise reconfigured, to operate deterministically. To enable this, signalling relating to a particular request for response-data that propagates through the data processor should contain the deterministic bit value, or a representation of it, such that each non-deterministic component may be configured appropriately.

It will be appreciated that whereas the data processors described above are coupled between a CPU and a memory, data processors according to embodiments of the present disclosure may also comprise a CPU, a multi-core CPU or a plurality of CPUs, and a memory or a plurality of memories.

A multi-core CPU has a plurality of cores, which may, in a two core example, have a higher-priority-core and a lower-priority-core. The higher-priority-core may execute most of the time-sensitive operations that require a high degree of determinism. The higher-priority-core may execute operations that are more time-sensitive than operations executed by the lower-priority-core.

In a multi-core CPU example, the external-operation-data may be representative of either a request for higher-priority-response-data from the higher-priority-core or a request for lower-priority-response-data from the lower-priority-core, where higher-priority-response-data and lower-priority-response-data are both examples of response-data.

When the deterministic-quantity value is the active-value, the active-value may be set as either a higher-priority-active-value (when the external-operation-data is representative of a request for higher-priority-response-data) or a lower-priority-active-value (when the external-operation-data is representative of a request for lower-priority-response-data).

More generally, the external-operation-data may comprises a core-identifier, which is representative of a core within a multi-core CPU. The memory-management-unit can then set the deterministic-quantity value as the inactive-value or one of a plurality of active-values based on the core-identifier. The control-block can determine a priority with which to send the memory-signal to the NDP-output-terminal if the deterministic-quantity value is an active-value, based on an associated one of the plurality of active-values. In this way, the deterministic-quantity value may assume a plurality of different active-values reflecting a plurality of different priority levels associated with a plurality of different cores that have a plurality of different degrees of time-sensitivity.

Where the data processor has a cross-bar configured to set a priority-order for handling different operations, the priority-order may set a higher-priority, when the active-value is a higher-priority-active-value, and a lower-priority, when the active-value is a lower-priority-active-value. In this way, different memory-signals may be sent by the cross-bar to the memory in a sequence based on the set priority-order, such that higher-priority memory signals may be sent before lower-priority memory signals. In a similar way, a hierarchy of progressively more time-sensitive cores may be granted progressively higher priority access to the cross-bar.

In some examples, different active-values of the deterministic-quantity may be set by a particular core of a CPU (whether the CPU is multi-core or single-core) to reflect different degrees of required determinism. In this way, a cross-bar receiving memory-signals from a plurality of different CPUs, or cores, may be controlled to prioritise processing of the memory-signals based on the need for determinism associated with each different memory-signal, irrespective of its origin or destination. This may advantageously improve the degree of determinism possible in a complex multi-processor data processing environment.

In some examples, a data processor according to the present disclosure may be provided as an integrated circuit or as a System on a Chip (SoC).

One or more examples disclosed can relate to the addition of a new "Deterministic" bit to a Memory Protection Unit (MPU) or Memory Management Unit (MMU). The deterministic bit may be considered as a conceptual extension a cache inhibit bit. Generally, the deterministic bit can operate to increase the priority of access to data processor resources whilst removing or bypassing dynamic or non-deterministic data processor resources (such as caches, pre-fetch buffers, and branch-target buffers (BTB)).

At a hardware level the deterministic bit may be implemented as an additional bit in the MPUs region descriptor of the MMUs TLB (Translation Lookaside Buffers). An additional sideband may be added to propagate this signal to the crossbar and slave resources located below the crossbar, such as memories. This signal may propagate in the same way as existing sideband signals, such as Process ID, albeit with different functionality.

Typical translation attributes for a region descriptor for an MMU/MPU may comprise:

W (Write Through, which determines if cache writes are written through main memory or not);
I (Cache Inhibit Mode, which determines whether a page is cacheable or not); and
E (Little or Bit Endian mode, where typically 0=Big Endian mode (Default) and 1=Little Endian mode)

The present disclosure introduces a new attribute—"D", the deterministic bit, which, when set to the active-value will cause accesses to that region to be treated as deterministic. This may be described as operation in 'Deterministic Mode'. In this way, when the active-value of the deterministic bit is set the data processor is configured to bypass elements which can adversely influence the determinism of a transaction.

A typical MMU could support 48 TLBs. An additional D (deterministic) bit may be added to each of these. These 48 bits of storage equates to 288 or 432 gates (given 6 or 9 gates per bit). A typical MPU may support 64 regions. An additional D (deterministic) bit may be added to each of these. These 64 bits of storage equates to 384 or 576 gates (given 6 or 9 gates per bit). The sideband signal may be added to bus transactions (from the core in the MMU case, or from the crossbar in the MPU case). Modifying an existing data processor design to exploit the deterministic bit concept disclosed herein may require only a simple addition of the necessary sideband as a number of other sidebands typically exist in a standard data processor.

An alternative approach for providing a high degree of determinism may be achieved by having multiple contexts which requires duplication of registers. However, this is far costlier, in terms of data processing resources, to implement than the approach described herein based on setting a deterministic bit value.

According to a first aspect of the present disclosure there is provided a data processor comprising: a memory-management-unit, with a MMU-input-terminal and a MMU-output-terminal, wherein the memory-management-unit may be configured to: receive at the MMU-input-terminal external-operation-data from a CPU, the external-operation-data representative of a request for response-data; set a deterministic-quantity value for the external-operation-data based on the external-operation-data, wherein the deterministic-quantity value may be either an active-value or an inactive-value; provide a memory-signal, based on the external-operation-data and the deterministic-quantity value, to the MMU-output-terminal, a non-deterministic-processor-block comprising: a NDP-input-terminal, configured to receive the memory-signal from the MMU-output-terminal; a control-block; a performance-enhancement-block; and a NDP-output-terminal, wherein the control-block may be configured to: (i) send the memory-signal to the NDP-output-terminal if the deterministic-quantity value is the active-value, thereby bypassing the performance-enhancement-block; or (ii) send at least a portion of the memory-signal that is representative of the request for response-data to the performance-enhancement-block if the deterministic-quantity value is the inactive-value, wherein: if the performance-enhancement-block comprises the response-data then the performance-enhancement-block may be configured to send the response-data to the CPU; or if the performance-enhancement-block does not comprise the response-data then the performance-enhancement-block may be configured to send the memory-signal to the NDP-output-terminal.

In one or more embodiments the memory-signal may comprise a control-signal and a request-signal. The control-signal may be representative of the deterministic-quantity value. The request-signal may be representative of the request for response-data. The non-deterministic-processor-block may further comprise: a path-block configured to receive the request-signal. The control-block may be configured to receive the control-signal and, based on the control-signal, the control-block may be configured to: (i) instruct the path-block to send the request-signal to the NDP-output-terminal if the deterministic-quantity value is the active-value, thereby bypassing the performance-enhancement-block; or (ii) instruct the path-block to send the request-signal to the performance-enhancement-block if the deterministic-quantity value is the inactive-value.

In one or more embodiments, if the performance-enhancement-block does not comprise the response-data then the performance-enhancement-block may be configured to send: the request-signal to the NDP-output-terminal; and the control-signal to the NDP-output-terminal.

In one or more embodiments the external-operation data may comprise: a determinism-signal, configured to set the value of the deterministic-quantity; and CPU-request-data, representative of the request for response-data.

In one or more embodiments the CPU-request data may comprise a data-portion representative of a memory-access-operation and an address-portion representative of a memory-location for performing the memory-access-operation.

In one or more embodiments the path-block may comprise: a data-path-block, configured to receive the data-portion; and an address-path-block, configured to receive the address-portion. The performance-enhancement-block may comprise a data-array and a tag-array, wherein: when the deterministic-quantity value is the active-value: the data-path-block may be configured to send the data-portion to the NDP-output-terminal; and the address-path-block may be configured to send the address-portion to the NDP-output-terminal. When the deterministic-quantity value is the inactive-value: the data-path-block may be configured to send the data-portion to the data-array; and the address-path-block may be configured to send the address-portion to the tag-array.

In one or more embodiments the external-operation-data may comprise a core-identifier, representative of a core within a multi-core CPU. The memory-management-unit may be configured to set the deterministic-quantity value as the inactive-value or one of a plurality of active-values, based on the core-identifier.

In one or more embodiments the control-block may be configured to determine a priority with which to send the memory-signal to the NDP-output-terminal if the deterministic-quantity value is an active-value, based on an associated one of the plurality of active-values.

In one or more embodiments the plurality of active-values may reflect a plurality of different priority levels associated with a core within a multi-core CPU.

In one or more embodiments the plurality of active-values may comprise a higher-priority-active-value and a lower-priority-active-value.

In one or more embodiments the external-operation-data may be from a multi-core CPU having a higher-priority-core and a lower-priority-core. The external-operation-data may be representative of either: a request, for higher-priority-response-data, from the higher-priority-core; or a request, for lower-priority-response-data, from the lower-priority-core. When the deterministic-quantity value is the active-value, the active-value may be set as either: a higher-priority-active-value, when the external-operation-data is representative of a request for higher-priority-response-data; or a lower-priority-active-value, when the external-operation-data is representative of a request for lower-priority-response-data.

In one or more embodiments any data processor disclosed herein may further comprise a crossbar coupled to the NDP-output-terminal. The crossbar may be configured to receive: the memory-signal from the NDP-output-terminal, the memory-signal representative of the request for response-data stored in a memory; and a plurality of further-signals, each of the plurality of further-signals representative of respective requests for respective response-data stored in the memory. The crossbar may be configured to set a priority-order for sending the memory-signal to the memory, based on the deterministic-quantity value.

In one or more embodiments the priority-order sets: a higher-priority, when the active-value is a higher-priority-active-value; and a lower-priority, when the active-value is a lower-priority-active-value.

In one or more embodiments the crossbar may be configured to send the memory-signal and the plurality of further-signals, to the memory, in a sequence based on the set priority-order.

In one or more embodiments there may be provided a data processor further comprising a second-non-deterministic-processor-block. The crossbar may be located between the memory-management-unit and the second-non-deterministic-processor-block. The second-non-deterministic-processor-block may be configured to: receive the memory-signal from the crossbar; and if the deterministic-quantity value is the active-value, then send a request to the memory to retrieve the request-data; or if the deterministic-quantity value is the inactive-value, then send the request to a second-performance-enhancement-block.

In one or more embodiments any data processor disclosed herein may further comprise a memory, wherein when the deterministic-quantity value is the active value the non-deterministic-processor block may be configured to send the request for response-data to the memory, thereby bypassing the performance-enhancement block.

In one or more embodiments any data processor disclosed herein may further comprise a CPU configured to provide the external-operation-data to the memory-management-unit.

In one or more embodiments the memory-management-unit may comprise a memory-protection-unit.

In one or more embodiments there may be provided an automotive system comprising any data processor disclosed herein.

In one or more embodiments the non-deterministic-processor-block may comprise a branch target buffer, a cache memory, or a pre-fetch buffer.

In one or more embodiments there may be provided an integrated circuit comprising any data processor disclosed herein.

While the disclosure is amenable to various modifications and alternative forms, specifics thereof have been shown by way of example in the drawings and will be described in detail. It should be understood, however, that other embodiments, beyond the particular embodiments described, are possible as well. All modifications, equivalents, and alternative embodiments falling within the spirit and scope of the appended claims are covered as well.

The above discussion is not intended to represent every example embodiment or every implementation within the scope of the current or future Claim sets.

The instructions and/or flowchart steps in the above figures can be executed in any order, unless a specific order is explicitly stated. Also, those skilled in the art will recognize that while one example set of instructions/method has been discussed, the material in this specification can be combined in a variety of ways to yield other examples as well, and are to be understood within a context provided by this detailed description.

In some example embodiments the set of instructions/method steps described above are implemented as functional and software instructions embodied as a set of executable instructions which are effected on a computer or machine which is programmed with and controlled by said executable instructions. Such instructions are loaded for execution on a processor (such as one or more CPUs). The term processor includes microprocessors, microcontrollers, processor modules or subsystems (including one or more microprocessors or microcontrollers), or other control or computing devices. A processor can refer to a single component or to plural components.

In other examples, the set of instructions/methods illustrated herein and data and instructions associated therewith are stored in respective storage devices, which are implemented as one or more non-transient machine or computer-readable or computer-usable storage media or mediums. Such computer-readable or computer usable storage medium or media is (are) considered to be part of an article (or article of manufacture). An article or article of manufacture can refer to any manufactured single component or multiple components. The non-transient machine or computer usable media or mediums as defined herein excludes signals, but such media or mediums may be capable of receiving and processing information from signals and/or other transient mediums.

Example embodiments of the material discussed in this specification can be implemented in whole or in part through network, computer, or data based devices and/or services. These may include cloud, internet, intranet, mobile, desktop, processor, look-up table, microcontroller, consumer equipment, infrastructure, or other enabling devices and services. As may be used herein and in the claims, the following non-exclusive definitions are provided.

In one example, one or more instructions or steps discussed herein are automated. The terms automated or automatically (and like variations thereof) mean controlled operation of an apparatus, system, and/or process using computers and/or mechanical/electrical devices without the necessity of human intervention, observation, effort and/or decision.

It will be appreciated that any components said to be coupled may be coupled or connected either directly or indirectly. In the case of indirect coupling, additional components may be located between the two components that are said to be coupled.

In this specification, example embodiments have been presented in terms of a selected set of details. However, a person of ordinary skill in the art would understand that many other example embodiments may be practiced which include a different selected set of these details. It is intended that the following claims cover all possible example embodiments.

What is claimed is:

1. A data processor comprising:
a memory-management-unit, with a MMU-input-terminal and a MMU-output-terminal, wherein the memory-management-unit is configured to:
   receive at the MMU-input-terminal external-operation-data from a CPU, the external-operation-data representative of a request for response-data;
   set a deterministic-quantity value for the external-operation-data based on the external-operation-data, wherein the deterministic-quantity value is either an active-value or an inactive-value,
      wherein the active-value of the deterministic-quantity value indicates that the response-data is required on a deterministic basis such that a time delay for providing the response-data needs to be well-known and accurate, and
      wherein the inactive-value of the deterministic-quantity value indicates that the response-data is not required on a deterministic basis such that the time delay for providing the response-data need not be well-known;
   provide a memory-signal, based on the external-operation-data and the deterministic-quantity value, to the MMU-output-terminal; and
a non-deterministic-processor-block comprising:
   a NDP-input-terminal, configured to receive the memory-signal from the MMU-output-terminal;
   a control-block;
   a performance-enhancement-block; and
   a NDP-output-terminal,
   wherein the control-block is configured to:
      (i) send the memory-signal to the NDP-output-terminal when the deterministic-quantity value is the active-value, thereby bypassing the performance-enhancement-block even when the time delay for providing the response data is greater bypassing the performance-enhancing-block as compared to not bypassing the performance-enhancement-block; or
      (ii) send at least a portion of the memory-signal that is representative of the request for response-data to the performance-enhancement-block when the deterministic-quantity value is the inactive-value, wherein:
         when the performance-enhancement-block comprises the response-data then the performance-enhancement-block is configured to send the response-data to the CPU; or
         when the performance-enhancement-block does not comprise the response-data then the performance-enhancement-block is configured to send the memory-signal to the NDP-output-terminal.

2. The data processor of claim 1, wherein the memory-signal comprises a control-signal and a request-signal, the control-signal is representative of the deterministic-quantity value, the request-signal is representative of the request for response-data, and wherein the non-deterministic-processor-block further comprises:
a path-block configured to receive the request-signal;
wherein the control-block is configured to receive the control-signal and, based on the control-signal, the control-block is configured to:
   (i) instruct the path-block to send the request-signal to the NDP-output-terminal when the deterministic-quantity value is the active-value, thereby bypassing the performance-enhancement-block; or
   (ii) instruct the path-block to send the request-signal to the performance-enhancement-block when the deterministic-quantity value is the inactive-value.

3. The data processor of claim 2, wherein when the performance-enhancement-block does not comprise the response-data then the performance-enhancement-block is configured to send:
the request-signal to the NDP-output-terminal; and
the control-signal to the NDP-output-terminal.

4. The data processor of claim 1, wherein the external-operation data comprises:
a determinism-signal, configured to set the value of the deterministic-quantity; and
CPU-request-data, representative of the request for response-data.

5. The data processor of claim 4, wherein the CPU-request data comprises a data-portion representative of a memory-access-operation and an address-portion representative of a memory-location for performing the memory-access-operation.

6. The data processor of claim 5, wherein:
the path-block comprises:
  a data-path-block, configured to receive the data-portion; and
  an address-path-block, configured to receive the address-portion; and
the performance-enhancement-block comprises a data-array and a tag-array, wherein:
  when the deterministic-quantity value is the active-value:
    the data-path-block is configured to send the data-portion to the NDP-output-terminal; and
    the address-path-block is configured to send the address-portion to the NDP-output-terminal, and
  when the deterministic-quantity value is the inactive-value:
    the data-path-block is configured to send the data-portion to the data-array; and
    the address-path-block is configured to send the address-portion to the tag-array.

7. The data processor of claim 1, wherein the external-operation-data comprises a core-identifier, representative of a core within a multi-core CPU, and wherein the memory-management-unit is configured to set the deterministic-quantity value as the inactive-value or one of a plurality of active-values based on the core-identifier.

8. The data processor of claim 7, wherein the control-block is configured to determine a priority with which to send the memory-signal to the NDP-output-terminal when the deterministic-quantity value is an active-value, based on an associated one of the plurality of active-values.

9. The data processor of claim 1, further comprising a crossbar coupled to the NDP-output-terminal, the crossbar configured to receive:
  the memory-signal from the NDP-output-terminal, the memory-signal representative of the request for response-data stored in a memory; and
  a plurality of further-signals, each of the plurality of further-signals representative of respective requests for respective response-data stored in the memory,
  wherein the crossbar is configured to set a priority-order for sending the memory-signal to the memory, based on the deterministic-quantity value.

10. The data processor of claim 8, wherein the crossbar is configured to send the memory-signal and the plurality of further-signals, to the memory, in a sequence based on the set priority-order.

11. The data processor of claim 8, further comprising a second-non-deterministic-processor-block, wherein:
  the crossbar is located between the memory-management-unit and the second-non-deterministic-processor-block; and
  the second-non-deterministic-processor-block is configured to:
    receive the memory-signal from the crossbar; and
    when the deterministic-quantity value is the active-value, then send a request to the memory to retrieve the request-data; or
    when the deterministic-quantity value is the inactive-value, then send the request to a second-performance-enhancement-block.

12. The data processor of claim 1, further comprising a memory, wherein when the deterministic-quantity value is the active value, the non-deterministic-processor block is configured to send the request for response-data to the memory, thereby bypassing the performance-enhancement block.

13. The data processor of claim 1, further comprising a CPU configured to provide the external-operation-data to the memory-management-unit.

14. The data processor of claim 1, wherein the memory-management-unit comprises a memory-protection-unit.

15. The data processor of claim 1, wherein the deterministic-quantity value comprises a bit value.

16. The data processor of claim 15, wherein the bit value is an attribute of a region descriptor, and wherein the MMU is configured to set the bit value based on a region of memory in which an address of the response-data resides.

17. An automotive system comprising the data processor of claim 1.

* * * * *